N. E. WHETSTONE.
CONDUIT OR CULVERT MOLD.
APPLICATION FILED DEC. 5, 1917.
1,275,115.
Patented Aug. 6, 1918.
2 SHEETS—SHEET 1.
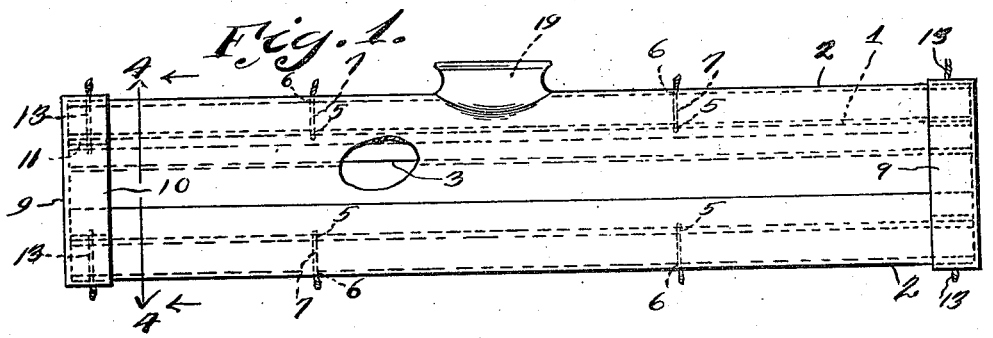
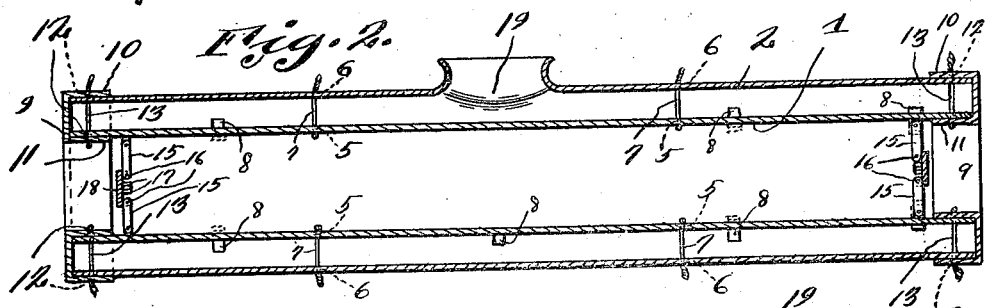
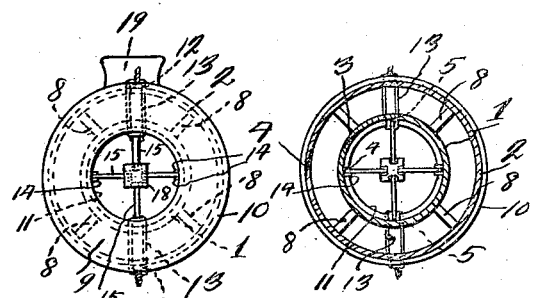
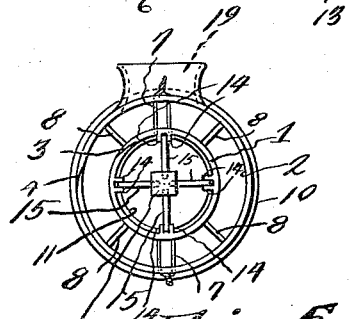
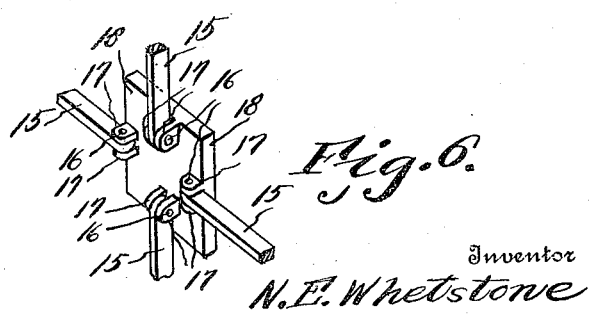
Inventor
N. E. Whetstone

N. E. WHETSTONE.
CONDUIT OR CULVERT MOLD.
APPLICATION FILED DEC. 5, 1917.

1,275,115.

Patented Aug. 6, 1918.
2 SHEETS—SHEET 2.

Witnesses
Philip Lowell
Francis L. Bowell

Inventor
N. E. Whetstone
By D. Swift & Co.
Attorneys

UNITED STATES PATENT OFFICE.

NEWELL E. WHETSTONE, OF POLAND, OHIO.

CONDUIT OR CULVERT MOLD.

1,275,115. Specification of Letters Patent. Patented Aug. 6, 1918.

Application filed December 5, 1917. Serial No. 205,577.

*To all whom it may concern:*

Be it known that I, NEWELL E. WHETSTONE, a citizen of the United States, residing at Poland, in the county of Mahoning, State of Ohio, have invented a new and useful Conduit or Culvert Mold; and I do hereby declare the following to be a full, clear, and exact description of the invention, such as will enable others skilled in the art to which it appertains to make and use the same.

This invention relates to an improved mold for molding cement conduits, or culverts, and one of the objects of the invention is to provide a simple, efficient and practical mold consisting of inner and outer tubular shells, between which the cement is deposited, to form the wall of the conduit.

A further object of the invention is the provision of tie or connecting wires, to hold the shells concentric.

A further object of the invention is the provision of a double flanged head at each end of the mold to insure holding the shells concentrically arranged.

A further object of the invention is the provision of means having link connections with the ends of the inner shell at the opposite ends of the mold, for expanding and contracting the inner shell which is longitudinally split.

A further object of the invention is the provision of means for molding culverts semi-circular in cross section.

In practical fields the details of construction may necessitate alterations falling within the scope of what is claimed.

The invention comprises further features and combination of parts as hereinafter set forth shown in the drawings and claimed.

In the drawings:—

Figure 1 is a view in side elevation of the improved mold constructed in accordance with the invention, showing interior parts in dotted lines.

Fig. 2 is a longitudinal sectional view.

Fig. 3 is a view of one end of the mold.

Fig. 4 is a sectional view on line 4—4 of Fig. 1.

Fig. 5 is a view of the opposite end of the mold.

Fig. 6 is a detail perspective view of the means at one end of the mold for expanding the inner tubular shell.

Figure 7:
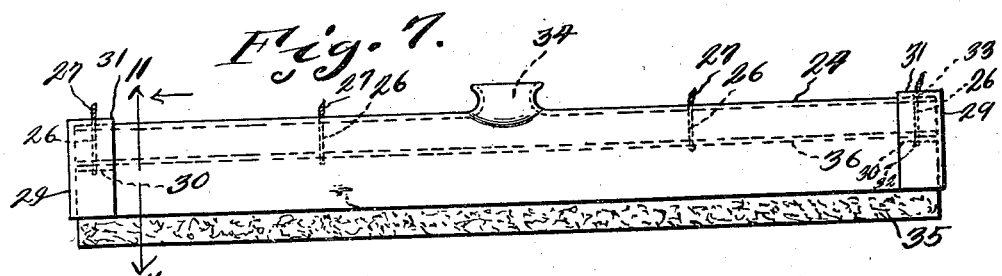
Fig. 7 is a view in side elevation of a mold for molding a culvert semi-circular in cross section.

Referring more especially to the drawings 1 and 2 designate the inner and outer shells of the mold, which are split longitudinally, as shown at 3 and 4. These splits each of which is constructed on a bias, are designed, whereby the joined walls may overlap slightly slidably. The inner and outer shells at corresponding diametrically opposite points have apertures 5 and 6. Wires are passed through the apertures 5 and 6, and the opposite ends of each wire 7 are brought toward each other and twisted together on the outer surface of the outer shell, assisting in holding the two shells concentric. Suitable spacing blocks 8 are interposed between the walls of the shells, in order to additionally insure spacing of the inner and outer shells. Both ends of the mold are provided with ring shaped cover plates 9 provided with flanges 10 and 11. The flanges 10 telescope the outer shell and the flanges 11 telescope into the inner shell, thereby holding the tubular shells of the mold in positive concentricity.

The inner and outer shells and the flanges 10 and 11 have apertures 12, which receive the wires 13, the ends of each of which are twisted together on the exterior of the flange 10, in order to hold the attendant parts in place. At the end of the mold opposite the plate 9, the inner shell is provided with spaced lugs or ears 14 arranged in pairs. Pivoted between the lugs of each pair is a link 15. The links extend radially, and their inner adjacent ends are provided at 16 between the ears or lugs 17 (which are also arranged in pairs) of the plate 18. It is to be noted that when the plate 18 is disposed, so that the links 15 will extend radially from the center of the plate 18, the corresponding edges of the links near their pivots will contact with the inner face of plate 18, thereby preventing movement of the plate 18 inwardly further than the radial disposition of the links. In molding a conduit the inner and outer shells are arranged one within the other, the spacing blocks and wire 8 and 7 are first arranged as shown in Figs. 1 and 2, and then the cover plate 9 is arranged whereby the flanges 10 and 11 will telescope the inner and outer shells, holding the inner and outer shells concentric and then the plate 18 is operated until the links will expand the inner shell to its proper position and concentric with the outer shell at the end of the mold opposite the cover plate 9. After so arranging the shells, cement or other plastic material is passed through the filling opening 19 of the outer shell, so that it will run or flow on a level or thereabout toward opposite ends of the mold and until it fills the space between the shells. After the cement has become set or hardened, the wires 8 and 13 may be removed, and then the cover plate 9 disconnected. The outer shell will then automatically expand, since the same is stripped or severed as shown at 4, and then by pulling outwardly on the plate 18 the inner shell will be allowed to contract automatically, after which the inner and outer shells may be easily removed. The expanding of the outer shell is due to the fact that the shell is constructed of sheet metal and is under an elastic strain, during the molding process of the culvert. The inner shell is likewise under an elastic strain when in place during the molding process of the culvert, but this elastic strain is just the opposite to the strain of the outer shell, and will tend to contract the inner shell, and when the plate 18 is pulled outwardly, the contracting of the inner shell is considerably assisted. The blocks 8 will be molded in the wall of the conduit, when the inner and outer shells are removed.

Figure 8:
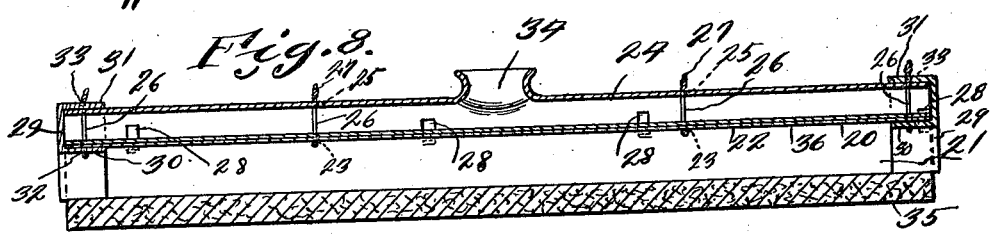
Fig. 8 is a longitudinal sectional view through Fig. 7.
Figures 9, 10, 11:
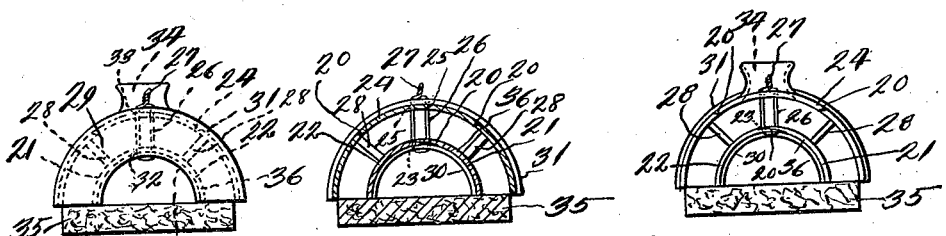
Fig. 9 is a view of one end of the mold shown in Fig. 7.
Fig. 10 is a view of the opposite end of the mold.
Fig. 11 is a sectional view on line 11 of Fig. 7.
Figure 12:
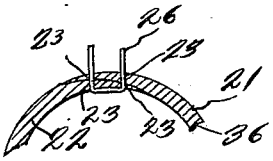
Fig. 12 is an enlarged detail sectional view of the joint between the two parts of the inner member of the culvert mold showing in Figs. 7 and 8.
Figure 13:
Fig. 13 is a detail perspective view of one of the spacing blocks used for assisting in spacing the inner and outer shells of the culvert mold.

In Figs. 7 and 8 the inner and outer shells are semi-circular in cross section, and are split longitudinally as shown at 20. In this manner the two shells may be constructed in two or as many sections 21 and 22, as may be desired. The section 21 overlaps the section 22. The overlapped portions of said sections have apertures 23, and the outer shell 24 has apertures 25, through which and through the apertures 23, wires 26 are arranged. The outer ends of the wires are twisted together as shown at 27 on the exterior of the outer shell. Suitable spacing blocks 28 are employed to hold the inner and outer shells spaced. A semi-circular ring over plate 29 is arranged at corresponding ends of the inner and outer shells, and has inner and outer flanges 30 and 31 which telescope the shells. These flanges 30 and 31 have apertures 32 and 33, and one of the spacing or securing wires 26 passes through such apertures 32 and 33, to hold the cover plate 28 in place. The outer shell 24 has a filling opening 34. A cement base 35 is first constructed, and then the inner shell 36 is placed upon the base, the outer shell is then arranged concentric with the inner shell and the spacing blocks or members 28 are arranged to hold said shells concentric. The cover plate 29 is then fixed and cement is subsequently passed through the opening 34 filling the space between the inner and outer shells as in the first instance.

The invention having been set forth what is claimed as new and useful is:—

1. In a conduit mold, inner and outer tubular shells of different diameters, one arranged within the other, tie wires and spacing members to hold the shells spaced, and means at each end of the mold to hold the opposite ends of the shells concentrically spaced.

2. In a conduit mold, inner and outer tubular shells of different diameters, one arranged within the other, tie wires and spacing members to hold the shells spaced, one end of the mold having a cover plate provided with inner and outer annular flanges telescoping the inner and outer shells, and means at one end of the inner shell for expanding the same concentric with the outer shell, said inner and outer shells being longitudinally split.

3. In a conduit mold, inner and outer tubular shells, each being longitudinally split, means at one end of the conduit to hold the shells concentric, tying means arranged at intervals along the mold to hold the shells concentric, one end of the inner shell opposite said first named means having expansion means to expand the inner shell concentric with the outer shell.

4. In a conduit mold, inner and outer tubular shells, each being longitudinally split, means at one end of the conduit to hold the shells concentric, tying means arranged at intervals along the mold to hold the shells concentric, one end of the inner shell opposite said first named means having expansion means to expand the inner shell concentric with the outer shell, said last named means comprising a plate, said plate having link connections with the inner shell, said links having pivotal connection with the inner face of said plate, whereby the edges of the link will contact with the inner face of the plate to limit the inward movement of said plate.

5. In a cement mold as set forth, inner and outer shells, spacing blocks between the shells at one end of the mold, tie wires connecting the inner and outer shells intermediate their ends and out of alinement with said blocks, the inner shell being longitudinally split, and a cover plate at the other end of the mold having inner and outer flanges telescoping the inner and outer shells.

6. In a cement mold, as set forth, inner and outer shells semi-circular in cross section, one being of less diameter than and arranged within the other, spacing blocks between the shells at one end of the mold, tie wires connecting the inner and outer shells intermediate their ends and being out of alinement with the blocks, the inner shell being longitudinally split, the outer shell having a filling opening, and a cover plate semi-circular and having inner and outer flanges telescoping the inner and outer shells.

In testimony whereof I have signed my name to this specification in the presence of two subscribing witnesses.

NEWELL E. WHETSTONE.

Witnesses:
H. MEEK,
C. C. RUDEBAUGH.

Copies of this patent may be obtained for five cents each, by addressing the "Commissioner of Patents, Washington, D. C."